United States Patent
Suzuki

(10) Patent No.: US 6,479,834 B1
(45) Date of Patent: Nov. 12, 2002

(54) DOUBLE-SIDE READING SYSTEM FOR REPRODUCING RADIATION IMAGE

(75) Inventor: Hideki Suzuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/348,309

(22) Filed: Jul. 7, 1999

(30) Foreign Application Priority Data

Jul. 7, 1998 (JP) .......................................... 10-208707

(51) Int. Cl.⁷ .......................... G01T 1/105; G03B 42/02
(52) U.S. Cl. ................... 250/584; 250/484.4; 250/585; 250/586; 250/588
(58) Field of Search ............................ 250/484.4, 584, 250/585, 586, 588

(56) References Cited

U.S. PATENT DOCUMENTS

| | | | | |
|---|---|---|---|---|
| 4,239,968 A | * | 12/1980 | Kotera et al. | 250/581 |
| 4,547,672 A | * | 10/1985 | Arakawa et al. | 250/483.1 |
| 4,571,496 A | * | 2/1986 | Arakawa et al. | 250/484.4 |
| 4,782,237 A | * | 11/1988 | Teraoka et al. | 250/486.1 |
| 5,534,710 A | * | 7/1996 | Suzuki | 250/588 |
| 5,591,982 A | * | 1/1997 | Kohda | 250/484.4 |
| 5,665,976 A | * | 9/1997 | Arakawa | 250/588 |
| 5,877,504 A | * | 3/1999 | Yanagita | 250/484.4 |
| 5,877,508 A | * | 3/1999 | Arakawa et al. | 250/588 |
| 5,880,476 A | * | 3/1999 | Suzuki | 250/484.4 |
| 6,075,250 A | * | 6/2000 | Fukui et al. | 250/484.4 |

* cited by examiner

Primary Examiner—Robert H. Kim
Assistant Examiner—Allen C. Ho
(74) Attorney, Agent, or Firm—Birch, Stewart, Kolasch & Birch, LLP

(57) ABSTRACT

A process for recording a radiation image on a radiation image storage panel containing stimulable phosphor particles and then reproducing the radiation image by the double side reading system is favorably performed employing a radiation image storage panel containing stimulable phosphor particles in which the stimulable phosphor particles vary in their mean particle sizes in the depth direction of the storage panel in such manner that the mean particle size on one surface side is smaller than the mean particle size on the other surface side, preferably under the condition that stimulating rays are applied onto the storage panel on the surface side having the phosphor particles of the smaller mean particle size to excite the phosphor particles in the storage panel.

4 Claims, 2 Drawing Sheets

DOUBLE-SIDE READING SYSTEM FOR REPRODUCING RADIATION IMAGE

FIELD OF THE INVENTION

The present invention relates to a double-side reading system for reproducing a radiation image which is stored in a radiation image storage panel containing stimulable phosphor particles.

BACKGROUND OF THE INVENTION

As a method replacing a conventional radiography, a radiation image recording and reproducing method utilizing a stimulable phosphor was proposed, and has been practically employed. The method employs a radiation image storage panel (i.e., stimulable phosphor sheet) comprising a stimulable phosphor, and comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The panel thus treated is subjected to a step for erasing a radiation image remaining therein, and then stored for the next recording and reproducing procedure. Thus, the radiation image storage panel can be repeatedly employed.

In the above-mentioned radiation image recording and reproducing method, a radiation image is obtainable with a sufficient amount of information by applying a radiation to the object at a considerably smaller dose, as compared with a conventional radiography using a combination of a radiographic film and radiographic intensifying screens.

The radiation image storage panel has a basic structure comprising a support and a stimulable phosphor layer provided thereon. However, if the phosphor layer is self-supporting, the support may be omitted. On the free surface (surface not facing the support) of the phosphor layer, a protective film is generally placed to keep the phosphor layer from chemical deterioration or physical shock.

The stimulable phosphor layer usually comprises a binder and stimulable phosphor particles dispersed therein, but it may consist of agglomerated phosphor particles without binder. The phosphor layer containing no binder can be formed by deposition process or sintering process. Further, a phosphor layer comprising agglomerated phosphor particles which are soaked with a polymer is also known. In any type of the phosphor layers, the stimulable phosphor particles emit stimulated emission when excited with stimulating rays after having been exposed to a radiation such as X-ray. Accordingly, the radiation having passed through an object or radiated from an object is absorbed by the phosphor layer of the radiation image storage panel in proportion to the dose of the applied radiation, and a radiation image of the object is produced and stored in the storage panel in the form of a radiation energy image. The radiation energy image can be released as stimulated emission by sequentially irradiating the storage panel with stimulating rays. The stimulated emission is then photoelectrically detected to give electric signals, so as to reproduce a visible image from the electric signals.

The radiation image recorded in the storage panel is generally read by the steps of applying the stimulating rays onto the front surface side (phosphor layer side) of the storage panel, collecting light (i.e., stimulated emission) emitted by the phosphor particles by means of a light-collecting means from the same side, and photoelectrically converting the light into digital signals of image. A system for reading the image from one side of the storage panel in this manner is referred to as "single-side reading system". However, there is a case that the light emitted by the phosphor particles should be collected from both sides (i.e., front and back surface sides) of the storage panel. For instance, there is a case that the emitted light should be collected as much as possible. There is also a case that the radiation image recorded in the phosphor layer varies along the depth of the phosphor layer, and that the variation should be detected. A system for reading the image from both sides of the radiation image storage panel is referred to as "double-side reading system". In Japanese Patent Provisional Publication No. 55 (1980)-87970, for example, the double-side reading system is described.

A radiation image storage panel employed in the double-side reading system, as well as a panel employed in the single-side reading system, is desired to be as sensitive as possible and to provide an image of high quality (high sharpness, high graininess, etc.).

In order to improve the quality of an image obtained by the conventional single-side reading system, various radiation image storage panels were proposed. For example, Japanese Patent Provisional Publication No. 59-139000 discloses a radiation image storage panel having plural phosphor layers each of which contains stimulable phosphor particles of a different mean particle size. Further, Japanese Patent Provisional Publication No. 59-138999 discloses a radiation image storage panel having a phosphor layer containing stimulable phosphor particles whose particle size distribution has two or more peaks.

The double-side reading system generally gives an image with high sensitivity, but from the viewpoint of image quality such as sharpness and graininess it is not always satisfactory. If an image recorded in a known radiation image storage panel is simply read by the double-side reading system in accordance with conventional knowledge and techniques for the single-side reading system, the radiation image obtained from the back surface side often exhibits poor quality (particularly, poor graininess at a high spatial frequency). Accordingly, the visible image reproduced by combining the signals thus obtained from both sides has poor quality.

SUMMARY OF THE INVENTION

It is an object of the present invention to provide a double-side reading system utilizing a radiation image storage panel by which an radiation image of improved quality (particularly, improved graininess at a high spatial frequency) can be obtained also from the back surface side.

The present invention resides a process for recording and reproducing a radiation image comprising the steps of:

applying a radiation having passed through an object or having radiated from an object onto a radiation image storage panel to absorb energy of the radiation, said radiation image storage panel comprising stimulable phosphor particles wherein the stimulable phosphor particles vary in their mean particle sizes in the depth direction of the storage panel in such manner that the mean particle size on one surface side is smaller than the mean particle size on the other surface side;

sequentially applying stimulating rays onto the radiation image storage panel, preferably on the surface side having the stimulable phosphor particles of the smaller mean particle size, to excite the stimulable phosphor particles in the storage panel whereby releasing the radiation energy stored in the phosphor particles as light emission;

collecting the light emission from both surface sides of the radiation image storage panel;

converting the light emission collected on each side into electric signals;

combining the electric signals having been converted from the light emission collected on each side; and reproducing the object in the form of a radiation image from the combined electric signals.

In the present specification, the "mean particle size" means an average size of locally positioned phosphor particles.

DETAILED DESCRIPTION OF THE INVENTION

Figure 1:
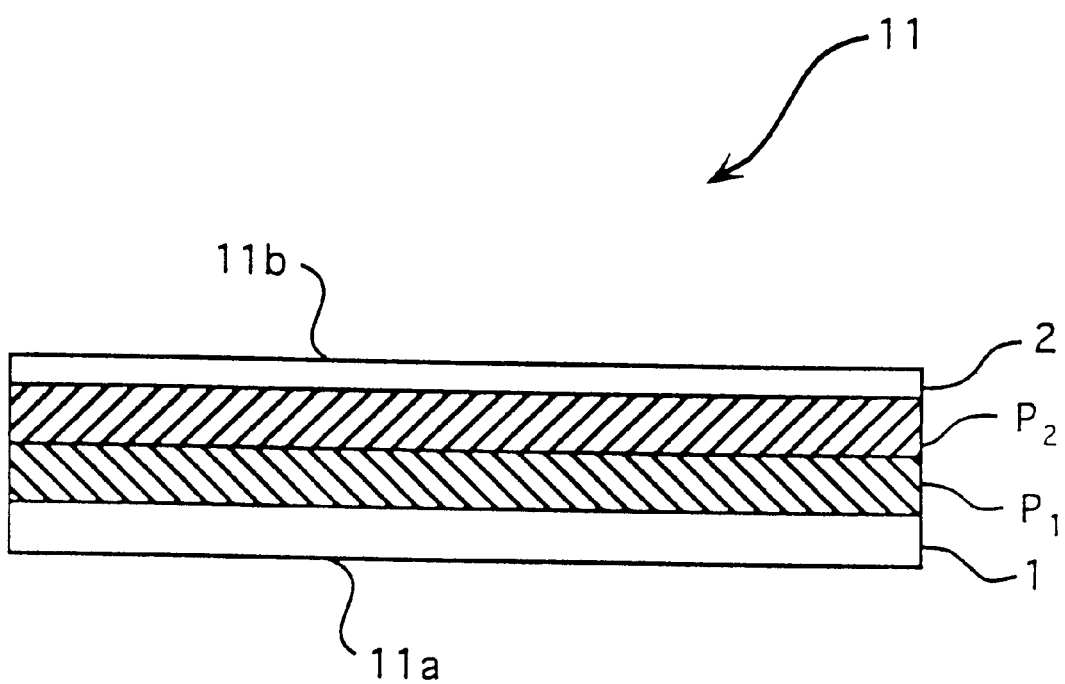
FIG. 1 schematically shows a section of a typical radiation image storage panel which is employed in the process of the invention.

The preferred embodiments of the invention are as follows.

(1) The radiation image recording and reproducing process further comprises a step of removing radiation energy remaining in the radiation image storage panel by applying an erasing light from both surface sides of the storage panel after the step of sequentially applying stimulating rays onto the storage panel.

(2) The radiation image storage panel employed in the radiation image recording and reproducing process comprises a transparent support sheet, a phosphor layer comprising the stimulable phosphor particles, and a transparent protective film, and the mean particle sizes of the stimulable phosphor particles in the phosphor layer vary in the depth direction of the storage panel in such manner that the mean particle size on the surface side facing the protective film is smaller than the mean particle size on the surface side facing the support sheet.

(3) The phosphor layer of the radiation image storage panel comprises two or more constituent phosphor layers and the mean particle size of the stimulable phosphor particles of the constituent phosphor layer facing the protective film is smaller than the mean particle size of the stimulable phosphor particles of the constituent phosphor layer facing the support sheet.

(4) The mean particle size of the stimulable phosphor particles of the constituent phosphor layer facing the protective film is in the range of 1 to 4 $\mu$m, and the mean particle size of the stimulable phosphor particles of the constituent phosphor layer facing the support sheet is in the range of 4 to 10 $\mu$m.

(5) The stimulable phosphor particles of the constituent phosphor layer facing the support sheet satisfies the following equation: $0<\sigma/\gamma\leq 0.5$, wherein $\sigma$ means a particle size distribution and $\gamma$ means a mean particle size.

(6) The stimulable phosphor particles are particles of an europium activated alkaline earth metal halide phosphor.

In the present specification, the "front surface" means the top surface of the stimulable phosphor layer (if a protective film is provided on the phosphor layer, it means the surface of that protective film). Thus, the "front surface" means a surface directly exposed to stimulating rays. The "back surface" means the bottom surface of the stimulable phosphor layer (if a transparent support sheet is provided on the phosphor layer, it means the bottom surface of that support sheet).

The radiation image storage panel of the invention for double-side reading system can be prepared in the following manner. A typical radiation image storage panel of the invention comprises a stimulable phosphor layer consisting of two or more sub-layers (i.e., constituent layers), and hence the panel having such multi-layered phosphor layer is described below as an example.

The transparent support sheet employed is usually a transparent plastic sheet or film. Examples of the plastic materials include polyethylene terephthalate, polyethylene naphthalate, polyamide, polyimide, and aramid resin. However, the material for the support is not restricted to those examples, and a plastic material having enough strength and high transparency is preferably employed. The thickness of the support generally is in the range of 10 to 1,000 $\mu$m.

On the support sheet, a stimulable phosphor layer consisting of two or more sub-layers is provided. Each sub-layer contains the phosphor particles of a mean particle size different from that of other sub-layer(s). A typical sub-layer comprises a binder and stimulable phosphor particles dispersed therein, and hence the stimulable phosphor layer consisting of such sub-layers is described below by way of example.

As the stimulable phosphor particles incorporated in the phosphor layer, particles of a phosphor giving a stimulated emission of a wavelength in the range of 300 to 500 nm when they are irradiated with stimulating rays of a wavelength in the range of 400 to 900 nm is preferably employed. Examples of the preferred phosphors include europium or cerium activated alkaline earth metal halide phosphors, and rare earth element (e.g., cerium) activated rare earth oxyhalide phosphors. These phosphors are preferred because they give stimulated emissions of high luminance. However, they are by no means given to restrict the stimulable phosphors employable in the radiation image storage panel, and any other phosphors can be also employed provided that they give stimulated emission when excited with stimulating rays after having been exposed to a radiation.

In the present invention, at least two kinds of stimulable phosphor particles having a different mean particle size are employed. For example, relatively small phosphor particles having a mean particle size of 1 to 4 $\mu$m and relatively large phosphor particles having a mean particle size of 4 to 10 $\mu$m are employed. Each of them may be separately incorporated into a different sub-layer. Otherwise, they may be mixed in an optionally determined ratio and incorporated into each sub-layer, so that each sub-layer may contain the phosphor particles of a different mean particle size. Preferably, the mean particle size in the top sub-layer (facing the protective film or the front surface of the storage panel) is smaller than that in the bottom sub-layer (facing the support sheet or the back surface of the panel). It is particularly preferred for the mean particle size to decrease gradually from the bottom sub-layer to the top sub-layer.

The top sub-layer preferably comprises, in an amount of 20 to 100 wt. %, the stimulable phosphor particles whose particle size distribution has a peak in the range of 1 to 4 $\mu$m (or whose mean particle size is in the range of 1 to 4 $\mu$m).

On the other hand, the bottom sub-layer preferably comprises the phosphor particles whose mean particle size is in the range of 4 to 10 μm. Further, the bottom sub-layer preferably comprises the phosphor particles satisfying the condition of 0<σ/γ0.5 in which γ represents the mean particle size and a represents the particle size distribution. The "particle size distribution σ" here means the standard deviation of the particle size distribution based on the average particle number.

The stimulable phosphor layer consisting of two or more sub-layers can be formed in the following manner.

First, at least two kinds of coating dispersion are prepared. For preparing each coating dispersion, phosphor particles and a binder are well mixed in an appropriate solvent to give a dispersion in which the particles are uniformly dispersed in the binder solution. Each dispersion may contain the phosphor particles of not only a different mean particle size but also a different kind of stimulable phosphor, and further may contain a different binder and/or solvent.

Examples of the binder materials include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. These may be crosslinked with a crosslinking agent.

Examples of the solvents employable in the preparation of the coating dispersion include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate, and butyl acetate; ethers such as dioxane, ethylene glycol monoethyl ether, ethylene glycol monomethyl ether and tetrahydrofuran; and mixtures of the above-mentioned compounds.

A ratio between the binder and the phosphor in the coating dispersion may be determined according to the characteristics of the desired radiation image storage panel and the nature of the phosphor employed. Generally, the ratio is in the range of 1:1 to 1:100 (binder:phosphor, by weight), preferably 1:8 to 1:40 (by weight). The coating dispersion may contain a dispersing agent to assist uniform dispersion of the phosphor particles, and also contain other additives such as a plasticizer for increasing the bonding between the binder and the phosphor particles.

In the above-mentioned manner, at least two kinds of coating dispersion containing a binder and phosphor particles can be prepared. They are then evenly coated on the surface of a support sheet, and dried to form the sub-layers. The coating procedure can be carried out using a conventional means such as a doctor blade, a roll coater, or a knife coater. The phosphor layer can be prepared by repeating the coating procedure with each coating dispersion to form the sub-layers one by one successively, or by simultaneously coating plural kinds of the coating dispersions by a simultaneous superposition coating method to form the sub-layers at one time.

Alternatively, the phosphor layer may be prepared in the following manner. Each coating dispersion is coated on a temporary support (e.g., a glass plate, a metal plate, a plastic sheet) and dried to form a phosphor sheet for each sub-layer, and then thus prepared phosphor sheets are superposed one on another and fixed on the genuine support sheet by pressing or using an adhesive agent. In this case, a phosphor sheet placed near the support may be reversed and fixed on the support sheet. In this case, the outer part (front part, part near the front or the back surface) contains a relatively large amount of the binder while the inner part (bottom part) contains a relatively small amount of the binder. The phosphor layer having such structure gives a radiation image of further improved quality.

Thus, the phosphor layer consisting of two or more sub-layers can be prepared.

The phosphor layer may consist of two sub-layers [i.e., upper(top) and lower(bottom) sub-layers], or may consist of three or more sub-layers. In any case, in at least two of them, each sub-layer contains the stimulable phosphor particles of a different mean particle size. Note that if the sub-layers are formed using the same binder and/or solvent, the interfaces therebetween are not always clear. The thickness of each sub-layer may be determined according to various conditions (e.g., characteristics of the desired radiation image storage panel, the nature of the phosphor employed, the mixing ratio between the binder and the phosphor), and generally is in the range of 20 μm to 1 mm (preferably 50 to 500 μm).

A transparent protective film is placed on the free surface (surface not facing the support sheet) of the phosphor layer to keep the phosphor layer from chemical deterioration or physical damage. The protective film can be prepared by various method, for example, by coating on the phosphor layer a solution in which transparent polymer material (e.g., cellulose derivatives, polymethyl methacrylate, or an organic solvent soluble-fluorocarbon resin) is dissolved in an appropriate solvent, by fixing a transparent resin film (e.g., film of organic polymer such as polyethylene terephthalate) onto the phosphor layer using an adhesive, or by depositing an inorganic material on the phosphor layer. In the protective film, various additives (e.g., light-scattering fine particles such as magnesium oxide, zinc oxide, and titanium dioxide; lubricating agent such as perfluoroolefin resin powder and silicone resin powder; crosslinking agent such as polyisocyanate) may be incorporated. The thickness of the protective film generally is in the range of approximately 0.1 to 20 μm.

In the-manner described above, the radiation image storage panel can be prepared. The stimulable phosphor layer may not need to have the above-described multilayered structure, and it may be a single layer in which the mean particle size of the phosphor particles locally positioned at one surface side differs from that of the phosphor particles at another surface side. If the phosphor layer is a single layer, preferred is the layer in which the mean particle size of the phosphor particles near the top surface (near the protective film) is relatively small while that of the phosphor particles near the bottom surface (near the support sheet) is relatively large.

The radiation image storage panel of the invention may be modified in various known ways. For example, in order to improve the sharpness of a resultant radiation image, at least one of the layers may be colored with a coloring agent which does not absorb stimulated emission but stimulating rays.

Referring to the attached drawings, the radiation image storage panel and the radiation image reproducing process are described below in detail.

Figure 2:
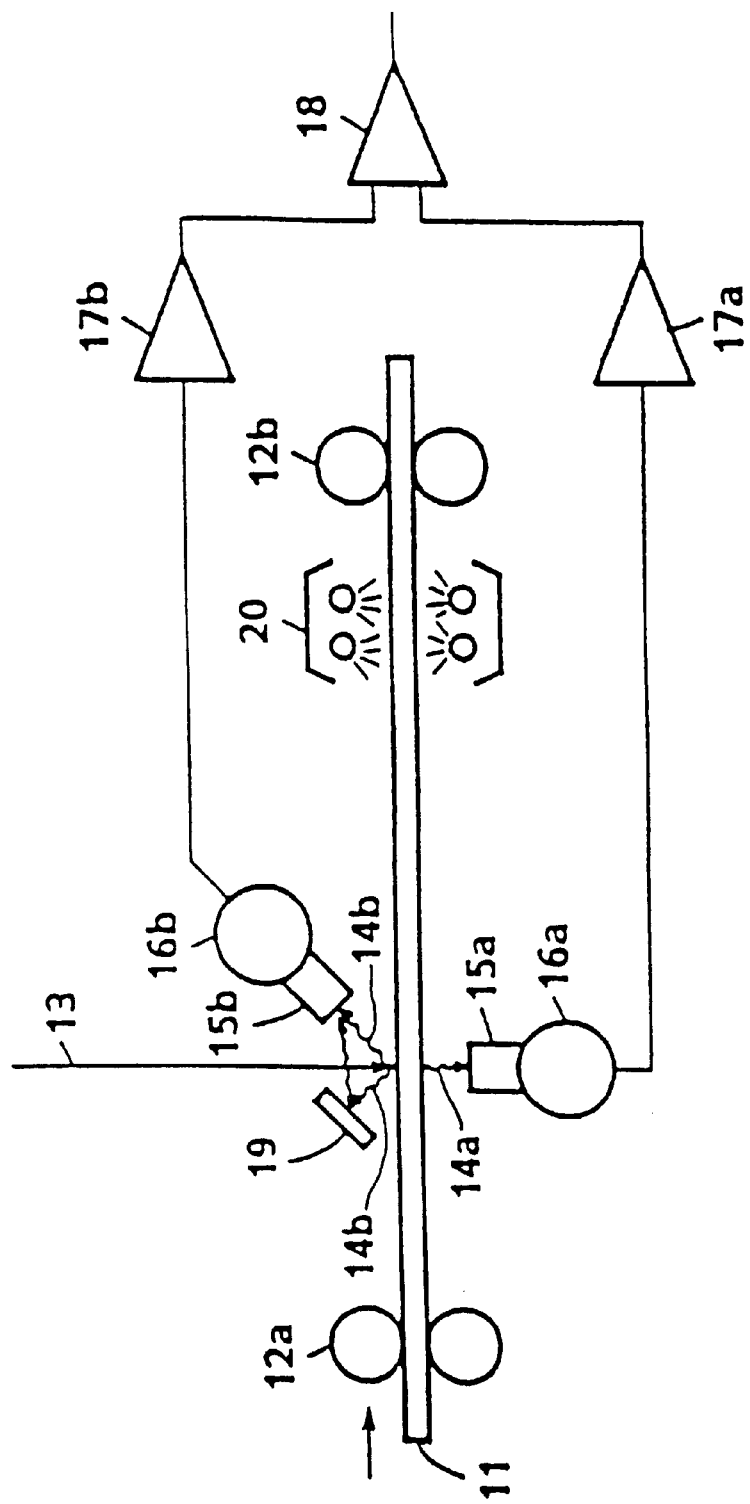
FIG. 2 schematically shows a double-side reading system to perform the radiation image reproducing process.

FIG. 1 schematically shows a section of a typical radiation image storage panel employed in the invention, and FIG. 2 schematically shows the double-side reading system.

In FIG. 1, the radiation image storage panel 11 comprises a transparent support sheet 1, a stimulable phosphor layer consisting of two sub-layers (i.e., two constituent layers comprising lower sub-layer $P_1$ and upper sub-layer $P_2$), and a transparent protective film 2 superposed thereon. In this case, the back surface 11a of the storage panel 11 is the bottom surface of the support sheet 1, and the front surface 11b is the top surface of the protective film 2.

In the apparatus of FIG. 2, the radiation image storage panel 11 is conveyed by means of a pair of nip rollers 12a and 12b. The stimulating rays 13 such as a laser beam are applied onto the front surface of the storage panel 11, and the stimulated emission radiated from the inside of the storage panel 11 is detected from both of the front and back surface sides. The stimulated emission 14a emitted from the back surface is collected with a light-collecting guide 15a provided below, and photoelectrically converted into a series of electric signals by means of an opto-electric conversion device (e.g., photomultiplier tube) 16a attached to the light-collecting guide 15a. The signals thus obtained from the back surface side of the storage panel are amplified in an amplifier 17a, and then transferred to a data processor 18. On the other hand, the stimulated emission 14b emitted from the front surface is, directly or via a mirror 19, collected by a light-collecting guide 15b provided above, and photoelectrically converted into a series of electric signals by means of an opto-electric conversion device (e.g., photomultiplier tube) 16b attached to the light-collecting guide 15b. The signals thus obtained from the front surface side of the panel are amplified in an amplifier 17b, and then transferred to the data processor 18. In the data processor 18, the signals transferred from the amplifiers 17a and 17b are combined and subjected to predetermined operation processes (e.g., addition, subtraction) according to the characteristics of the aimed radiation image, so as to obtain the desired radiation image signals.

The radiation image storage panel 11 thus treated is then conveyed in the direction of the arrow by means of the nip rollers 12a and 12b, and successively exposed to erasing light radiated from the erasing light sources 20 for performing the erasing procedure. By the erasing procedure, a radiation energy remaining in the phosphor layer of the storage panel 11 after reading procedure is released to remove so that the latent image of the remaining radiation energy may not give undesirable effects to the next recording procedure.

EXAMPLES

Example 1

(1) Preparation of the Stimulable Phosphor Sheet $p_1$

Stimulable phosphor particles $X_1$ (BaFBr$_{0.85}$I$_{0.15}$:Eu$^{2+}$, mean particle size: 2.9 μm) and stimulable phosphor particles $X_2$ (BaFBr$_{0.85}$I$_{0.15}$:Eu$^{2+}$, mean particle size: 6.3 μm) are mixed in the ratio of 30/70 by weight. 200 g of the mixture thus prepared, 7.0 g of a binder (polyurethane elastomer, T-5265H (solid) [trade name], available from Dai-nippon Ink & Chemicals, Inc.), 2.5 g of an anti-yellowing agent (epoxy resin, EP1001 (solid) [trade name], available from Yuka Shell Epoxy Kabushiki Kaisha), and 5.0 g of a crosslinking agent (isocyanate resin, Colonate HX [trade name], available from Nippon Polyurethane Co., Ltd.) were added into methyl ethyl ketone, and mixed by means of a propeller mixer to prepare a coating dispersion having the viscosity of 30 PS at 25° C. (binder/phosphor: 1/20, by weight). Thus prepared coating dispersion was coated on a temporary support (polyethylene terephthalate sheet having a surface beforehand coated with a silicon releasing agent) of 180 μm thick, and dried to form a phosphor film. The phosphor film thus formed was then peeled from the temporary support to prepare a phosphor sheet $p_1$ (thickness: 200 μm).

(2) Preparation of the Stimulable Phosphor Sheet $p_2$

The above procedure was repeated except that 200 g of the stimulable phosphor particles $X_2$ (BaFBr$_{0.85}$I$_{0.15}$:Eu$^{2+}$, mean particle size: 6.3 μm) only was used as the phosphor particles, to prepare a phosphor sheet $p_2$ (thickness: 200 μm).

(3) Phosphor Layer Consisting of Sub-layers $p_1$ and $p_2$

On a transparent support sheet (thickness: 188 μm) of polyethylene terephthalate (Lumilar S-10 [trade name], available from Toray Industries, Inc.), a polyester resin (a mixture of Byron 300 and Byron 200 [trade names] in the ratio of 7:3 by weight, available from Toyobo Co., Ltd.) was coated to form a transparent adhesive layer. The stimulable phosphor sheets $p_1$ and $p_2$ were laminated and placed on the adhesive layer in this order, and pressed under heating by means of a calendar roll to form a phosphor layer consisting of sub-layers $p_1$ and $p_2$. In this procedure, the sheet $p_1$ was reversed after it was formed in (1), and then laminated on the sheet $p_2$ which was not reversed.

(4) Formation of Protective Films

A polyethylene terephthalate film (thickness: 6 μm) having a surface provided with a polyester adhesive layer was placed on the phosphor layer so that the adhesive layer might be in contact with the sub-layer $p_2$, and then pressed under heating at 90 to 100° C. by means of a heating roll.

Independently, 50 g of 50 wt. % xylene solution of a fluorocarbon resin (copolymer of fluoro-olefin and vinyl ether, Lumiflon LF100 [trade name], available from Asahi Glass Co., Ltd.), 5.0 g of a crosslinking agent (isocyanate resin, Colonate HX [trade name], available from Nippon Polyurethane Co., Ltd.), and 0.5 g of alcohol-modified silicone oligomer whose dimethylpolysiloxane structure has hydroxyl (carbinol) groups at the terminals (solid content: 66 wt. %, X-22-2809 [trade name], available from The Shin-Etsu Chemical Co., Ltd.) were added into methyl ethyl ketone, to prepare a coating liquid having the viscosity of 0.1 to 0.3 PS. In the coating liquid, fine particles of a benzoguanamine resin (mean particle size: 0.3 μm, Epostar S [trade name], available from Nippon Shokubai Co., Ltd.) were added in an amount of 6.0 wt. % based on the amount of the fluorocarbon resin. Thus, a coating liquid containing light-scattering fine particles was prepared. The coating liquid was then coated on the polyethylene terephthalate film overlaid on the sub-layer $p_2$ by means of a doctor blade, and dried and cured at 120° C. for 20 minutes to form a protective fluoro-carbon resin film (thickness: 1.5 μm) containing light-scattering fine particles. The refractive indexes of thus formed protective film and the benzoguanamine resin particles contained therein were 1.45 and 1.57, respectively.

Thus, a radiation image storage panel comprising a transparent support, a phosphor layer consisting of two sub-layers $P_1$ and $P_2$, and transparent protective films was prepared.

Examples 2 to 8

The procedures of Example 1 were repeated except that the ratio of $X_1/X_2$ in each sub-layer ($P_1$, $P_2$) was adjusted to the value shown in Table 1, to prepare a radiation image storage panel.

Comparison Examples 1 to 3

The procedures of Example 1 were repeated except that only the sub-layer $P_2$ was formed and that the ratio of $X_1/X_2$ in the sub-layer $P_2$ was adjusted to the value shown in Table 1, to prepare a radiation image storage panel for comparison.

Evaluation of Radiation Image Storage Panel

Sharpness and graininess of a radiation image given by each storage panel prepared above were measured to evaluate the radiation image storage panel.

After the sample storage panel was exposed to X-rays (tube voltage: 80 kVp) through an MTF chart, the stimulable phosphor particles in the storage panel were excited with He—Ne laser (stimulating rays, wavelength: 632.8 nm). The stimulated emission was detected from both surface sides of the storage panel by means of photo-multiplier tubes (S-5), and converted into electric signals. The electric signals thus obtained from both surface sides were combined to reproduce the radiation image on a display of an image-reproducing apparatus, and the MIF (modulation transfer function) and the RMS (root mean square granularity) of the image were measured. Independently, the same procedure was repeated under the condition that the dose of X-ray was set at 0.1 mR, 1 mR, or 10 mR, so as to obtain the values of MTF and RMS. On the basis of the values thus obtained, the data were calibrated. The image quality was evaluated based on the RMS value giving an MTF of 55% at a spatial frequency of 1 cycle/mm (dose of X-ray: 1 mR). The smaller the RMS value is, the better image quality the storage panel gives. The results are set forth in Table 1.

TABLE 1

| sub-layer | phosphor ratio $X_1/X_2$ | mean particle size γ (μm) | particle size distribution σ |
|---|---|---|---|
| Example 1 RMS value (1 mR): 0.00948 | | | |
| $P_1$ | 30/70 | 5.3 | 0.54 |
| $P_2$ | 0/100 | 6.3 | 0.39 |
| Example 2 RMS value (1 mR): 0.00960 | | | |
| $P_1$ | 50/50 | 4.6 | 0.59 |
| $P_2$ | 0/100 | 6.3 | 0.39 |
| Example 3 RMS value (1 mR): 0.00970 | | | |
| $P_1$ | 100/0 | 2.9 | 0.47 |
| $P_2$ | 0/100 | 6.3 | 0.39 |
| Example 4 RMS value (1 mR): 0.00872 | | | |
| $P_1$ | 0/100 | 6.3 | 0.39 |
| $P_2$ | 30/70 | 5.3 | 0.54 |
| Example 5 RMS value (1 mR): 0.00898 | | | |
| $P_1$ | 0/100 | 6.3 | 0.39 |
| $P_2$ | 50/50 | 4.6 | 0.59 |
| Example 6 RMS value (1 mR): 0.00885 | | | |
| $P_1$ | 0/100 | 6.3 | 0.39 |
| $P_2$ | 70/30 | 3.9 | 0.64 |
| Example 7 RMS value (1 mR): 0.00879 | | | |
| $P_1$ | 0/100 | 6.3 | 0.39 |
| $P_2$ | 100/0 | 2.9 | 0.47 |
| Example 9 RMS value (1 mR): 0.00895 | | | |
| $P_1$ | 50/50 | 4.6 | 0.59 |
| $P_2$ | 100/0 | 2.9 | 0.47 |
| Comparison Example 1 RMS value (1 mR): 0.0115 | | | |
| $P_1$ | — | — | — |
| $P_2$ | 0/100 | 6.3 | 0.39 |
| Comparison Example 2 RMS value (1 mR): 0.0105 | | | |
| $P_1$ | — | — | — |
| $P_2$ | 50/50 | 4.6 | 0.59 |
| Comparison Example 3 RMS value (1 mR): 0.0102 | | | |
| $P_1$ | — | — | — |
| $P_2$ | 100/0 | 2.9 | 0.47 |

The results in Table 1 indicate the following fact. Each radiation image storage panel of the invention (Examples 1–8) gives an image of a small RMS, and accordingly gives an image of improved quality in a relatively high spatial frequency range, as compared with conventional storage panels (Comparison Examples 1–3). In particular, the storage panel in which the mean particle size in the upper sub-layer is smaller than that in the lower sub-layer (Examples 4–8) gives an image of remarkably improved quality.

What is claimed is:

1. A process for recording and reproducing a radiation image comprising the steps of:

applying a radiation having passed through an object or having radiated from an object onto a radiation image storage panel to absorb energy of the radiation, said radiation image storage panel comprising stimulable phosphor particles wherein the stimulable phosphor particles vary in their mean particle sizes in the depth direction of the storage panel in such manner that the mean particle size on one surface side is smaller than the mean particle size on the other surface side;

sequentially applying stimulating rays onto the radiation image storage panel on the surface side having the stimulable phosphor particles of the smaller mean particle size to excite the stimulable phosphor particles in the storage panel whereby releasing the radiation energy stored in the phosphor particles as light emission;

collecting the light emission from both surface sides of the radiation image storage panel;

converting the light emission collected on each side into electric signals;

combining the electric signals having been converted from the light emission collected on each side; and reproducing the object in the form of a radiation image from the combined electric signals;

wherein the radiation image storage panel comprises a transparent support sheet, a phosphor layer comprising the stimulable phosphor particles, and a transparent protective film, and the mean particle sizes of the stimulable phosphor particles in the phosphor layer vary in the depth direction of the storage panel in such manner that the mean particle size on the surface side facing the protective film is smaller than the mean particle size on the surface side facing the support sheet.

2. The process of claim 1, wherein the phosphor layer comprises two or more constituent phosphor layers and the mean particle size of the stimulable phosphor particles of the constituent phosphor layer facing the protective film is smaller than the mean particle size of the stimulable phosphor particles of the constituent phosphor layer facing the support sheet.

3. The process of claim 2, wherein the mean particle size of the stimulable phosphor particles of the constituent phosphor layer facing the protective film is in the range of 1 to 4 $\mu$m, and the mean particle size of the stimulable phosphor particles of the constituent phosphor layer facing the support sheet is in the range of 4 to 10 $\mu$m.

4. The process of claim 2, wherein the stimulable phosphor particles of the constituent phosphor layer facing the support sheet satisfies the following equation:

$$0 < \sigma/\gamma \leq 0.5$$

wherein $\sigma$ means a particle size distribution and $\gamma$ means a mean particle size.

* * * * *